(12) United States Patent
Tsukamura et al.

(10) Patent No.: US 6,941,462 B1
(45) Date of Patent: Sep. 6, 2005

(54) AUTHENTICATION SYSTEM, FINGERPRINT IDENTIFICATION UNIT, AND AUTHENTICATION METHOD

(75) Inventors: Yoshihiro Tsukamura, Kanagawa (JP); Takeshi Funahashi, Saitama (JP)

(73) Assignee: Sony Corporation, (JP)

( * ) Notice: Subject to any disclaimer, the term of this patent is extended or adjusted under 35 U.S.C. 154(b) by 0 days.

(21) Appl. No.: 09/466,965

(22) Filed: Dec. 20, 1999

(30) Foreign Application Priority Data

Dec. 21, 1998 (JP) .............................. P10-362942

(51) Int. Cl.[7] .............................................. G06K 9/00
(52) U.S. Cl. ...................... 713/186; 713/164; 713/155; 713/171
(58) Field of Search .............................. 713/186, 171, 713/155, 164

(56) References Cited

U.S. PATENT DOCUMENTS

| | | | | |
|---|---|---|---|---|
| 4,993,068 A | * | 2/1991 | Piosenka et al. | 380/23 |
| 5,495,533 A | * | 2/1996 | Linehan et al. | 713/155 |
| 5,534,855 A | * | 7/1996 | Shockley et al. | 340/825.3 |
| 5,604,802 A | * | 2/1997 | Holloway | 380/24 |
| 5,680,460 A | * | 10/1997 | Tomko et al. | 380/23 |
| 5,751,809 A | * | 5/1998 | Davis et al. | 380/23 |
| 5,838,812 A | * | 11/1998 | Pare, Jr. et al. | 382/115 |
| 6,052,468 A | * | 4/2000 | Hillhouse | 380/281 |
| 6,484,260 B1 | * | 11/2002 | Scott et al. | 713/186 |

FOREIGN PATENT DOCUMENTS

JP      10-302047      11/1998

OTHER PUBLICATIONS

Lipton et al., "Modern Trends in Authentication", ACM Press, vol. 3, Issue 2-4 Fall/Winter 1985.*
Anderson T., "Management Guideline for PC Security", ACM, pp. 1118-1122, 1992.*
Sandhu et al., "Authentication , Access Control, and Audit", ACM Computing Surveys, vol. 28, No. 1, Mar. 1996.*

* cited by examiner

*Primary Examiner*—Gregory Morse
*Assistant Examiner*—Tongoc Tran
(74) *Attorney, Agent, or Firm*—Rader, Fishman & Grauer PLLC; Ronald P. Kananen

(57) ABSTRACT

When the user inputs an instruction for accessing storage information stored in a fingerprint identification unit to a host computer, the host computer sends an identification instruction command to the fingerprint identification unit. A fingerprint detection section formed of an LED, a lens barrel, a CCD, and an A/D converter read the fingerprint of the user, identifies the fingerprint by using an identification controller, and allows the user to access the storage information only when the identification result is affirmative. The identification result is also sent to the host computer simultaneously.

7 Claims, 4 Drawing Sheets

AUTHENTICATION SYSTEM, FINGERPRINT IDENTIFICATION UNIT, AND AUTHENTICATION METHOD

BACKGROUND OF THE INVENTION

1. Field of the Invention

The present invention relates to authentication systems which authenticate a person who has already been known to the systems, and more particularly, to an authentication system, a fingerprint identification unit, and an authentication method used when stored information is manipulated.

2. Description of the Related Art

Encryption technologies used for information security in electronic money, electronic mail, and electronic settlement have undergone remarkable development in recent years.

In systems handling electronic money, such as electronic commerce using the Internet, it is necessary to prevent impersonation, which is a crime in which a person pretends to be another person and performs a false transaction, and a denial, which is a crime in which a party concerned denies a transaction after the party has performed the transaction to avoid the debt of the transaction. Encryption technologies are used to authenticate a person to prevent such an impersonation and to issue a certification using a digital signature technique to prevent such a denial.

A public-key encryption method is one encryption technology. In this method, a public key which is made public and a private key which the parties concerned hold confidentially are generated, text (including an order form and a bill) encrypted by the use of the public key is decrypted with the use of the private key. The features of this method are that text encrypted by the use of the public key can be decrypted only with the use of the private key, and conversely, text encrypted by the use of the private key can be decrypted only with the use of the public key. With the use of this feature, authentication and a digital signature are realized. As described above, information security is achieved with the use of the public-key encryption method on condition that the parties concerned keep the private key confidential. At present, the private key is stored in a hard disk of a computer or in a secondary storage medium such as an IC card, and is allowed to be read by the use of a password. Alternatively, the private key is kept by an authentication organization.

It is difficult, however, to keep the private key used in the public-key encryption method confidential, in other words, to keep the private key such that a third party cannot find it. Currently, there is no reliable apparatus or technology to safely keep the private key generated in the public-key encryption method.

When the private key is kept with an assigned password, for example, if the password is found, the private key is easily removed. A method for storing the private key in an IC card has been proposed. In this method, however, a password needs to be used as a trigger in encryption and decryption of the private key in the IC card. Therefore, in the same way as in the method in which the private key is stored in the host computer, if the password is found, the private key is easily removed. When an authentication organization stores the private key, it provides safety since it uses a very confidential system whereas it requires a reasonable amount of money.

Even if the private key is stored absolutely confidentially, the private key appears temporarily when encryption and decryption are performed in a computer. A special program which operates in such a condition could be created to find the private key. If this occurs, the public-key encryption method can be broken.

In the above description, the private key in the public-key encryption method needs to be confidentially stored. An encryption key used in a symmetric encryption method (an identical encryption key is used both in encryption and decryption), a password, and other important data also need to be stored safely.

SUMMARY OF THE INVENTION

The present invention has been made in consideration of the foregoing points. It is an object of the present invention to provide an authentication system, a fingerprint identification apparatus, and an authentication method which allow important data such as a private key to be safely stored.

The foregoing object is achieved in one aspect of the present invention through the provision of an authentication system used when stored information is manipulated, including a host computer which has input means for inputting a user's instruction; command output means for generating from the user's instruction an instruction command which requests a predetermined processing to be executed and for outputting it; communication means for communicating with an external unit; a fingerprint identification apparatus which has communication means for communicating with the host computer; processing control means for executing a predetermined processing according to the instruction command input from the host computer by the communication means; fingerprint detection means for detecting a fingerprint and for generating fingerprint data; storage-information recording means for recording the fingerprint data and storage information related to the fingerprint data; and fingerprint identification means for verifying fingerprint data detected by the fingerprint detection means with the fingerprint data recorded by the storage-information recording means.

In an authentication system having such a structure, when the user inputs an instruction to the input means of the host computer, the instruction is sent to the fingerprint identification apparatus as an instruction command through the communication means by the command output means. The fingerprint identification apparatus receives the instruction command by the communication means and executes the processing corresponding to the instruction command by the processing control means. When the processing handles storage information recorded into the storage-information recording means, the host computer first sends a fingerprint-identification instruction command. The fingerprint identification apparatus reads a fingerprint by the fingerprint detection means, identifies the fingerprint by the fingerprint identification means, allows the storage-information recording means to be accessed when the identification result is affirmative, and sends the identification result to the host computer by the communication means. The host computer allows the next instruction when the identification result obtained by the communication means is affirmative.

As described above, in the present invention, when important storage information such as a private key is accessed, for example, the host computer first sends a fingerprint-identification instruction command to the fingerprint identification apparatus. The fingerprint identification apparatus identifies a fingerprint, authenticates the user only when the identification result is affirmative, and allows the next instruction, namely, the storage information to be accessed. In this way, since the user is authenticated by fingerprint identification when important storage information such as a private key is accessed, the information is safely stored. In addition, when an encrypted text is decrypted by the use of the private key in the fingerprint identification apparatus, for example, the private key is not used outside the fingerprint identification apparatus. Therefore, anyone, including a hacker, cannot steal the private key from the host computer. Thus, safe storage is possible. There is also no need to use an authentication organization which requires money.

The foregoing object is achieved in another aspect of the present invention through the provision of a fingerprint identification apparatus in an authentication system used when stored information is manipulated, including communication means for communicating with a host computer; processing control means for executing a predetermined processing according to an instruction command input from the host computer by the communication means; fingerprint detection means for detecting a fingerprint and for generating fingerprint data; storage-information recording means for recording the fingerprint data and storage information related to the fingerprint data; and fingerprint identification means for verifying fingerprint data detected by the fingerprint detection means with the fingerprint data recorded by the storage-information recording means.

A fingerprint identification apparatus having such a structure stores important storage information and the fingerprint data of a person who can access the information, in the storage-information recording means with a predetermined relationship. When storage information is accessed, the host computer issues a fingerprint-identification instruction command. When the fingerprint identification apparatus receives the fingerprint-identification instruction command by the communication means, the fingerprint identification apparatus reads a fingerprint by the fingerprint detection means, compares the fingerprint read by the fingerprint detection means with fingerprint data recorded into the storage-information instruction command by the fingerprint identification means to identify the fingerprint, allows the storage-information recording means to be accessed when the identification result is affirmative, and sends the identification result to the host computer by the communication means.

When a fingerprint-identification instruction command is input from the host computer, the fingerprint identification apparatus of the present invention reads a fingerprint by the fingerprint detection means, compares the fingerprint with recorded fingerprint data to identify the fingerprint, and allows the storage information to be accessed only when the identification result is affirmative. In this way, since the user is authenticated by fingerprint identification when important storage information stored in the fingerprint identification apparatus such as a private key is accessed, the information is safely stored.

The foregoing object is achieved in still another aspect of the present invention through the provision of an authentication method used when stored information is manipulated, including the steps of a host computer informing the user of a fingerprint-identification request according to a user's instruction and issuing a fingerprint-identification instruction command to a fingerprint identification apparatus; the fingerprint identification apparatus reading a fingerprint after the user places a finger on the fingerprint identification apparatus, verifying the read fingerprint with a stored fingerprint, and sending the fingerprint-identification result to the host computer; the host computer allowing the user to specify the next instruction when the result is affirmative, and issuing the instruction command corresponding to the next instruction; and the fingerprint identification apparatus accessing storage information according to the instruction command and executing a predetermined processing.

In an authentication method having such steps, when an instruction to access storage information of the fingerprint identification apparatus is input to the host computer, a fingerprint-identification request is issued to the user and a fingerprint-identification instruction command is sent to the fingerprint identification apparatus. The fingerprint identification apparatus reads the fingerprint of the user, compares the fingerprint with entered fingerprint data for identification, allows the storage information to be accessed when the identification result is affirmative, and outputs the identification result to the host computer. The host computer allows the next instruction to be input when the identification result is affirmative. When the next instruction is input, the instruction command corresponding to the instruction is issued, and the fingerprint identification apparatus executes a predetermined processing.

In the authentication method of the present invention, when an instruction to access storage information of the fingerprint identification apparatus is input to the host computer, a fingerprint-identification request is issued to the user and the fingerprint identification apparatus identifies a fingerprint. The fingerprint identification apparatus allows the storage information to be accessed only when the identification result is affirmative. Then, the fingerprint identification apparatus executes a predetermined processing according to the next instruction of the host computer. In this way, when important storage information stored in the fingerprint identification apparatus such as a private key is accessed, since the information is allowed to be accessed only when the user is authenticated by fingerprint identification, the information is safely stored.

The foregoing object is achieved in yet another aspect of the present invention through the provision of an authentication method used when stored information is manipulated, including the steps of issuing a fingerprint-identification instruction command; receiving the result of the fingerprint identification performed according to the command; allowing the user to specify the next instruction when the fingerprint identification result is affirmative; and issuing the instruction command of the next instruction to allow the storage information corresponding to the instruction command to be accessed.

In an authentication method having such steps, when a fingerprint-identification instruction command is issued, fingerprint identification is performed. When the fingerprint identification result is affirmative, the user is allowed to input the next instruction. When the next instruction is input, the instruction command corresponding to the instruction is issued and storage information corresponding to the instruction command is allowed to be accessed.

In the authentication method of the present invention, when an instruction to access storage information is input, a fingerprint is identified. The storage information is allowed to be accessed only when the identification result is affirmative. Then, a predetermined processing is executed according to the next instruction. In this way, when important storage information stored in the fingerprint identification apparatus such as a private key is accessed, since the information is allowed to be accessed only when the user is authenticated by fingerprint identification, the information is safely stored.

DESCRIPTION OF THE PREFERRED EMBODIMENT

Figure 1:
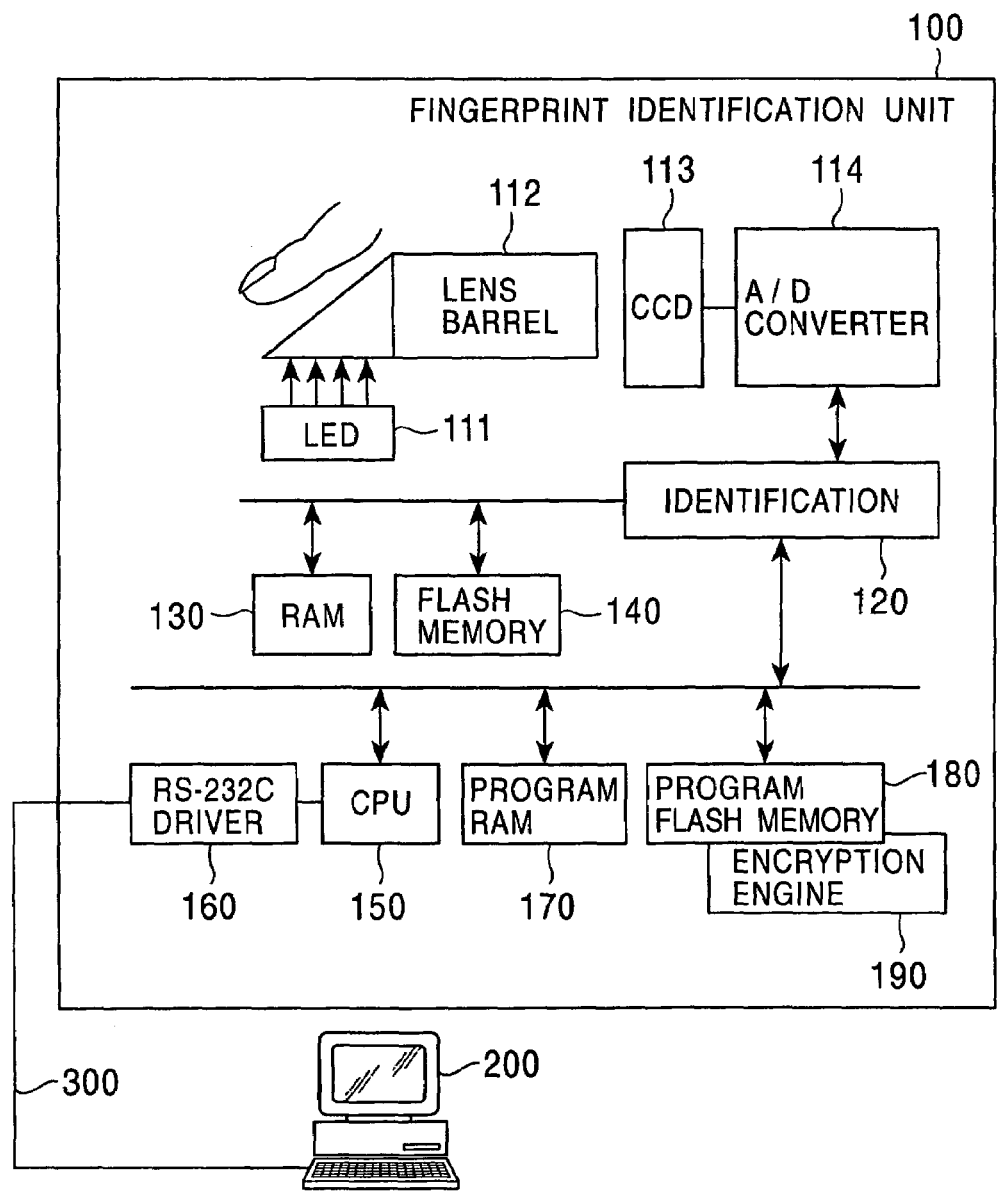
FIG. 1 is a block diagram of an authentication system according to an embodiment of the present invention.

An embodiment of the present invention will be described below by referring to the drawings. A case in which an encryption key in the public-key encryption method is stored will be taken in an embodiment of the present invention. An authentication system of the present invention functions most effectively in this case.

The principle and operation of the public-key encryption method will be described. In the public-key encryption method, two encryption keys, a public key and a private key, are generated. These two keys have a relationship in which text encrypted by the use of one key can be decrypted only with the use of the other key. The public key is made open to all persons who use a system, such as an electronic-money system. The private key is kept by individuals or stored in an authentication organization.

A case in which a product is ordered with the use of electronic money will be described. The orderer sends an order slip encrypted by the use of the orderer's own private key to a seller. The seller decrypts the received order slip with the use of the orderer's public key. When the slip is correctly decrypted, it is certified that the person has definitely ordered. (In this case, even if the person attempts to deny the order, since, theoretically, people other than that person cannot encrypt the order slip, that person is identified as the orderer.) Then, the seller sends a bill encrypted by the orderer's public key to the orderer together with the ordered product. The orderer decrypts the bill with the use of the orderer's own private key and pays the bill. It is important that an attempt to change the amount or the money transfer destination on the bill is substantially impossible because people other than the orderer cannot decrypt the bill while the bill passes through points on the Internet. With the use of the public-key encryption method, electronic commerce is safely performed.

An authentication system according to the present invention will be described next. FIG. 1 is a block diagram of an authentication system according to an embodiment of the present invention.

In the authentication system according to the present embodiment, a fingerprint identification unit 100 which performs authentication is connected to a host computer 200 which sends instructions to the fingerprint identification unit 100, with a communication cable 300.

The fingerprint identification unit 100 is formed of an LED 111, a lens barrel 112, a CCD 113, and an A/D converter 114 collectively serving as fingerprint detection means for optically detecting a fingerprint and for converting it to an electric signal; an identification controller 120 serving as fingerprint identification means for identifying read fingerprint data; a RAM 130; a flash memory 140 serving as storage-information recording means; a CPU 150 serving as processing control means; an RS-232C driver 160 serving as communication means with the host computer 200; a program RAM 170; a program flash memory 180; and an encryption engine 190 serving as encryption processing means.

When a finger is placed on a predetermined position, the LED 111 is turned on, and the lens barrel 112 and the CCD 113 optically read the fingerprint. The data taken by the CCD 113 is analog-to-digital (A/D) converted and a feature point in the digitized data is used as fingerprint data. The identification controller 120 compares the fingerprint data generated by the fingerprint detection means with fingerprint data which has been entered, for identification. The RAM 130 temporarily stores data when the identification controller 120 operates.

Figure 2:
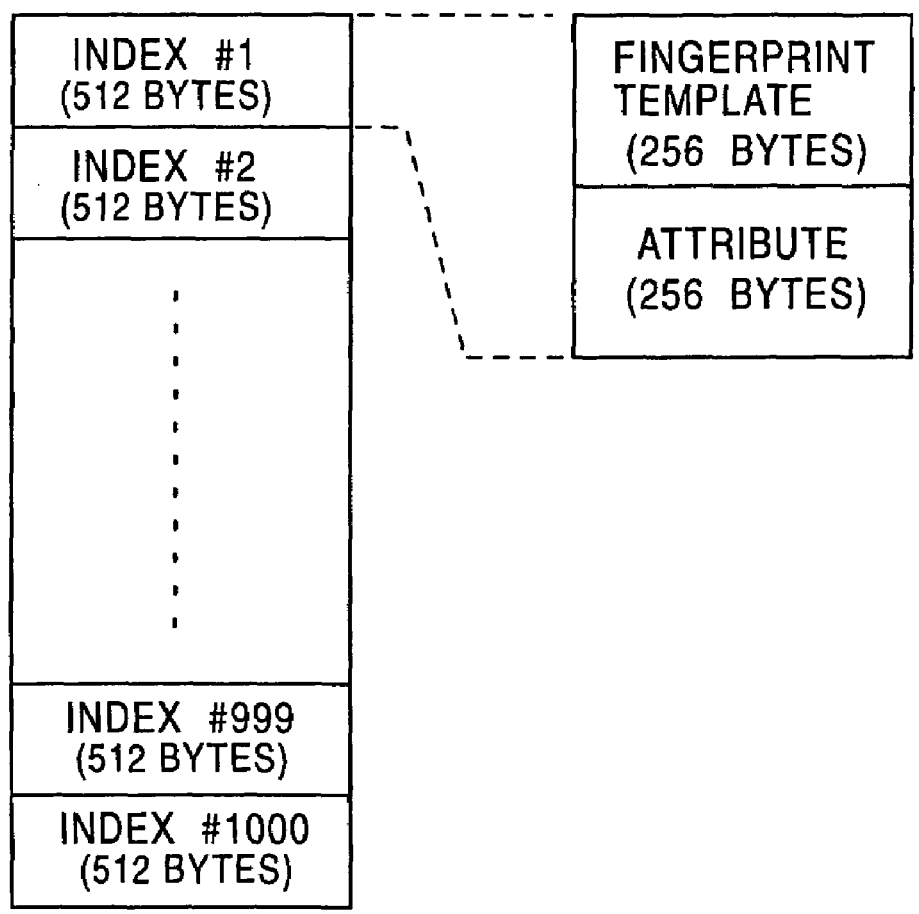
FIG. 2 is a structural view of a storage-information storage section of the authentication system according to the embodiment of the present invention.

The flash memory 140 serves as storage-information recording means for recording the fingerprint data (hereinafter called a template) generated by the fingerprint detection means, according to an instruction. In addition to the template, the flash memory 140 stores storage information related to the template, such as an encryption key. The structure of the flash memory 140 will be described below. FIG. 2 is a structural view of the storage-information recording section of the authentication system according to the present embodiment of the present invention. The flash memory 140 provides one index for one fingerprint. In the present embodiment, a total of 1000 indexes are provided. Each index is divided into two areas. One is a template area for storing fingerprint data, and the other is an attribute area for storing related important information such as an encryption key.

Back to FIG. 1, the authentication system will be further described. The CPU 150 controls the entire fingerprint identification unit 100 and performs predetermined processing according to an instruction command sent from the host computer 200. The RS-232C driver 160 serves as an interface for communicating with the host computer 200. The program RAM 170 temporarily stores data obtained when a program is executed, and data is read therefrom or written thereinto by the CPU 150. The program flash memory 180 is used when a program is executed. The encryption engine 190 generates an encryption key and performs encryption and decryption with the use of the encryption key. In the following description, the encryption engine 190 performs the processing of the public-key encryption method.

The host computer 200 is a general personal computer or the like, and includes communication means for communicating with the fingerprint identification unit 100 through the communication cable 300, command output means for generating an instruction command and for outputting it to the fingerprint identification unit 100, and input means for inputting a user's instruction. Since a general personal computer has these types of means, descriptions thereof will be omitted.

The communication cable 300 connects the fingerprint identification unit 100 to the host computer 200, and is an RS-232C cable in the present embodiment.

The operation of the authentication system having the above structure and an authentication method will be described below.

When the user accesses storage information stored in the flash memory 140 of the fingerprint identification unit 100, the host computer 200 displays a message requesting fingerprint identification, and sends a fingerprint-identification instruction command to the fingerprint identification unit 100. When the user places a finger on the fingerprint detection means of the fingerprint identification unit 100, the LED 111, the lens barrel 112, the CCD 113, and the A/D converter collectively serving as the fingerprint detection means generate fingerprint data. The identification controller 120 compares the generated fingerprint data with fingerprint data which has been entered, for identification. When the identification result indicates matching, the user is allowed to access the storage information stored in the flash memory 140 only once immediately after the identification. The identification result is sent by the CPU 150 to the host computer 200 connected with the communication cable 300 through the RS-232C driver 160. When the user specifies decryption of an encrypted text, the encrypted text is sent to the fingerprint identification unit 100. The fingerprint identification unit 100 reads the private key stored in the flash memory 140, decrypts the encrypted text by the encryption engine 190, and sends the decrypted plain text to the host computer 200. As described above, since the private key is not passed to the host computer 200, it is impossible to steal the private key from the host computer 200, and a very safe authentication system is provided.

As access processing to storage information, a procedure for entering fingerprint data into the fingerprint identification unit, a procedure for generating an encryption key and entering it, and a procedure for decrypting a symmetric encryption key generated by the use of an encryption key will be specifically described. Hereinafter, the host computer is called a PC, and the fingerprint identification unit is called an FIU.

A procedure for entering fingerprint data will be described first. Before issuing an enter command, to delete all data for an index for which data enter is specified in the FIU, the PC sends the specified index number and a delete command. Then, the PC issues an enter command together with the specified index number. The FIU records the fingerprint generated by the fingerprint detection means described above into the flash memory 140 at the specified index.

Figure 3:
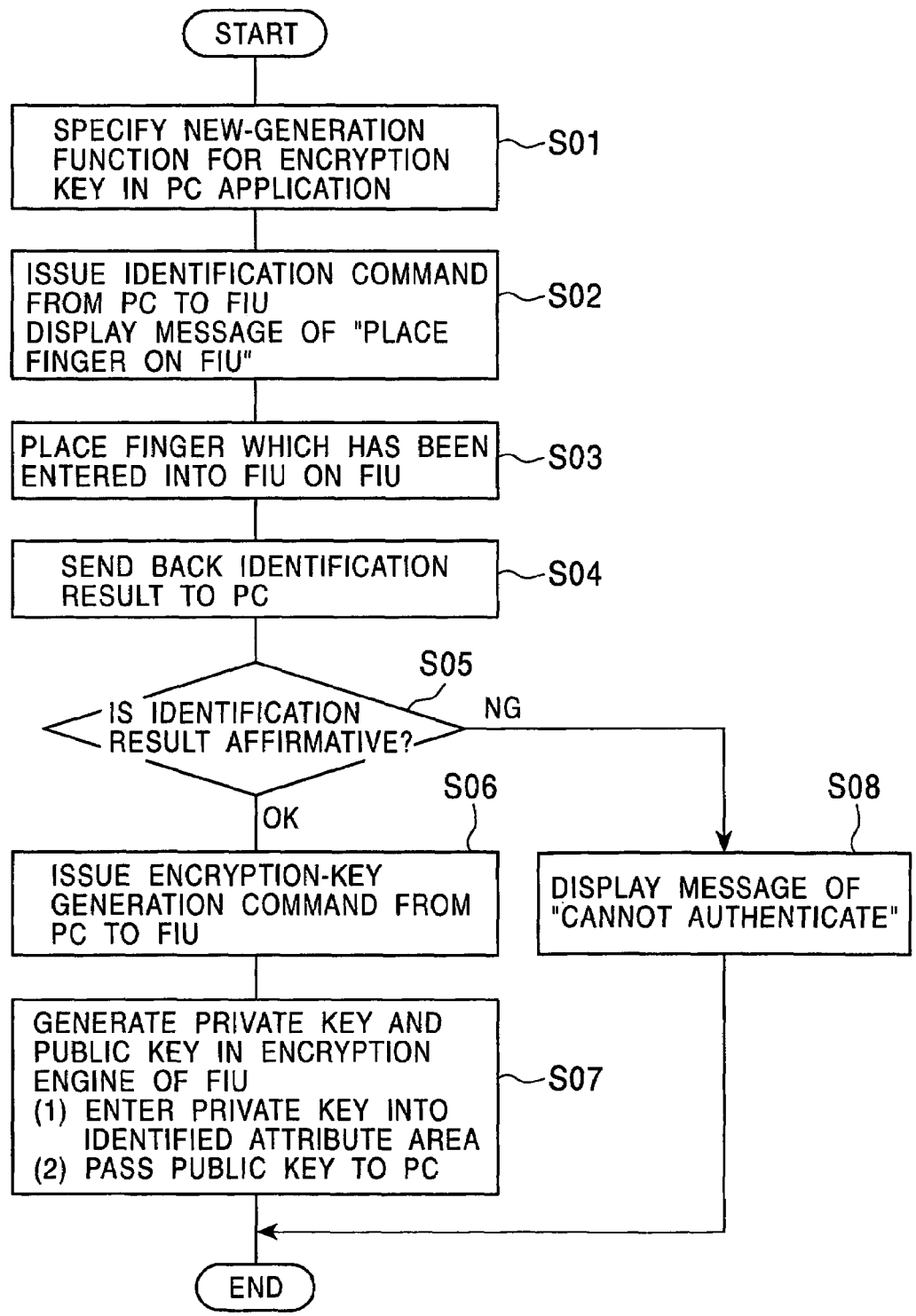
FIG. 3 is a flowchart of a procedure for generating a new encryption key and entering it in the authentication system according to the embodiment of the present invention.

Secondly, a procedure for generating a new encryption key and entering it will be described. FIG. 3 is a flowchart of the procedure for generating an encryption key and entering it in the authentication system according to the present embodiment of the present invention. The user specifies a new generation of an encryption key in an encryption application in the PC in a step S01. The PC issues an fingerprint identification command to the FIU, and displays a message of "Place finger on FIU" in a step S02. When the user places a finger on the FIU in a step S03, identification is performed in the procedure described above, and the result is sent back to the PC in a step S04. When the identification result is affirmative, the attribute area of the index is opened. This is effective only for the next command, and the attribute area will be closed after the next command. When the PC receives the identification result and it is affirmative, the PC issues an encryption-key generation command to the FIU in a step S06. The FIU generates a private key and a public key by the encryption engine in the public-key encryption method, and stores the private key in the attribute area being opened, in a step S07. Then, the attribute area is closed. The FIU sends back the public key to the PC in the step S07. The PC sends this public key to the receiving side which uses the encryption system. When the identification result is negative, the PC issues a message of "Cannot authenticate" in the step S08.

Figure 4:
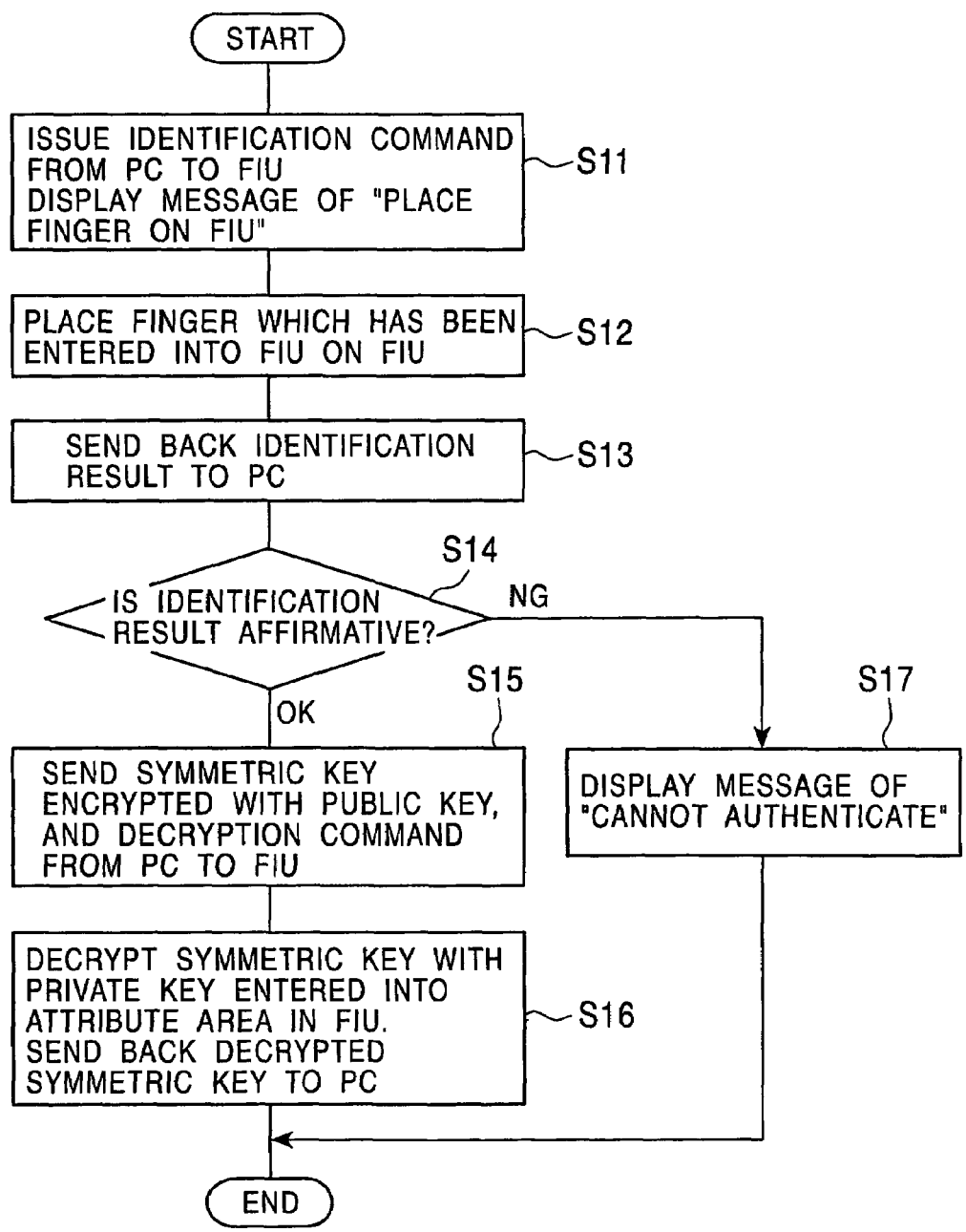
FIG. 4 is a flowchart of a procedure for decrypting a symmetric key in the authentication system according to the embodiment of the present invention.

Thirdly, a procedure for decrypting a symmetric encryption key generated by the use of an encryption key will be described. A symmetric key is used by the receiving side of encryption to encrypt a predetermined text. The receiving side sends the encrypted text encrypted by the symmetric key and the symmetric key encrypted by the public key. This is because encrypting text by the use of the symmetric key is faster in computation than encrypting and decrypting text by the use of the public key (or the private key) and is advantageous in time in the process of the encryption system. In this way, the generator who has generated the two encryption keys in the public-key encryption method by using the FIU receives the encrypted text encrypted by the symmetric key and the symmetric key encrypted by the public key. FIG. 4 is a flowchart of a procedure for decrypting a symmetric encryption key in the authentication system according to the present embodiment of the present invention. In decryption, the PC issues a fingerprint identification command to the FIU, and displays a message of "Place finger on FIU" on a PC display in a step S11. When the user places a finger on the FIU in a step S12, identification is performed in the procedure described above, and the result is sent back to the PC in a step S13. When the identification result is affirmative, the attribute area of the index is opened. The PC sends the encrypted symmetric key to the FIU together with a decryption command in a step S15. The FIU takes the private key out of the attribute area being opened, decrypts the encrypted symmetric key, and sends back it to the PC in a step S16. The PC decrypts the encrypted text by the use of this decrypted symmetric key. When the identification result is negative, the PC issues a message of "Cannot authenticate" in the step S17.

In the above description, the symmetric key is encrypted by the use of the public key. The symmetric key may be encrypted by the use of the user's private key in the fingerprint identification unit.

The above processing function can be achieved by a computer. In that case, the processing contents of the functions which the authentication system and the fingerprint identification unit should have are described as a program stored in a computer-readable recording medium. When the computer executes the program, the above processing is implemented. Computer-readable recording media include magnetic recording devices and semiconductor memories. To distribute the program in the market, the program is stored in a portable recording medium, such as a compact-disk read-only memory (CD-ROM) or a floppy disk, and distributed. Alternatively, the program is stored in a storage device of a computer connected through a network, and transferred to another computer through the network. When the program is executed by a computer, the program is stored in a hard disk drive of the computer, loaded into the main memory, and executed.

What is claimed is:

1. An authentication system used when stored information is manipulated, comprising:
   a host computer comprising:
   input means for inputting a user's instruction;
   command output means for generating from the user's instruction an instruction command which requests a predetermined processing to be executed and for outputting the instruction command; and
   communication means for communicating with an external unit; and
   a fingerprint identification apparatus comprising:
   communication means for communicating with said host computer;
   processing control means for executing a predetermined processing according to the instruction command input from said host computer by said communication means;

fingerprint detection means for detecting a fingerprint and for generating fingerprint data;

storage-information recording means for recording the fingerprint data and storage information related to the fingerprint data; and fingerprint identification means for verifying fingerprint data detected by said fingerprint detection means with the fingerprint data recorded by said storage-information recording means, wherein said storage-information recording means stores a private key generated by the public-key encryption method, wherein said processing control means accesses the generated private key, decrypts a symmetric key, and decrypts the encrypted text using the decrypted symmetric key when the user's instruction specifies a decryption of an encrypted text, wherein said processing control means generates a symmetric key and a public key to encrypt the symmetric key when the user's instruction specifies an encryption of plain text, and wherein the user's instruction is send from the host computer through communication cable.

2. The authentication system according to claim 1, wherein said storage-information recording means allows recorded storage information to be accessed only once immediately after the fingerprint-identification result is affirmative.

3. The authentication system according to claim 1, wherein said fingerprint identification apparatus further comprises encryption processing means for generating an encryption key, for performing encryption by the use of the encryption key, and for performing decryption.

4. The authentication system according to claim 3, wherein said encryption processing means generates a public key and a private key according to the public-key encryption method, and decrypts an encrypted text by the use of the private key, wherein the encrypted text is received from the host computer and decrypted plain text is sent to the host computer.

5. An authentication method used when stored information is manipulated, comprising the steps of:

a host computer informing a user of a fingerprint-identification request according to a user's instruction and issuing a fingerprint-identification instruction command to a fingerprint identification apparatus;

the fingerprint identification apparatus reading a fingerprint after the user places a finger on the fingerprint identification apparatus, verifying the read fingerprint with a stored fingerprint, and sending a fingerprint-identification result to the host computer;

the host computer allowing the user to specify the next instruction when the result is affirmative, and issuing the instruction command corresponding to the next instruction; and the fingerprint identification apparatus accessing storage information according to the instruction command and executing a predetermined processing, wherein said storage-information recording means stores a private key generated by the public-key encryption method, and wherein the fingerprint identification apparatus accesses the generated private key, decrypts a symmetric key, and decrypts the encrypted text using the decrypted symmetric key when the instruction command specifies a decryption of an encrypted text, wherein the fingerprint identification apparatus generates a symmetric key and a public key to encrypt the symmetric key when the instruction command is one that specifies an encryption of plain text, and wherein the instruction command is sent to the host computer through communication cable.

6. The authentication method according to claim 5, wherein, in the step of the fingerprint identification apparatus accessing the storage information according to the instruction command and executing a predetermined processing, the storage information is allowed to be accessed only once immediately after the fingerprint-identification result is affirmative.

7. The authentication method according to claim 5, wherein the storage information includes a private key generated by the public-key encryption method, and in the step of the fingerprint identification apparatus accessing the storage information according to the instruction command and executing a predetermined processing, a predetermined encrypted text is decrypted by the use of the private key, wherein the encrypted text is received from the host computer and decrypted plain text is sent to the host computer.

* * * * *

UNITED STATES PATENT AND TRADEMARK OFFICE
CERTIFICATE OF CORRECTION

| | | |
|---|---|---|
| PATENT NO. | : 6,941,462 B1 | Page 1 of 1 |
| APPLICATION NO. | : 09/466965 | |
| DATED | : September 5, 2005 | |
| INVENTOR(S) | : Yoshihiro Tsukamura et al. | |

It is certified that error appears in the above-identified patent and that said Letters Patent is hereby corrected as shown below:

Column 9:
Line 22, "send from" should read -- sent to --.

Signed and Sealed this

Nineteenth Day of December, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,941,462 B1 | Page 1 of 1 |
| APPLICATION NO. | : 09/466965 | |
| DATED | : September 6, 2005 | |
| INVENTOR(S) | : Yoshihiro Tsukamura et al. | |

It is certified that error appears in the above-identified patent and that said Letters Patent is hereby corrected as shown below:

Column 9:
Line 22, "send from" should read -- sent to --.

This certificate supersedes Certificate of Correction issued December 19, 2006.

Signed and Sealed this

Sixth Day of February, 2007

JON W. DUDAS
*Director of the United States Patent and Trademark Office*